Oct. 13, 1925.

O. E. HUYCK

BEET TOPPER

Filed Sept. 2, 1924

1,557,289

Oliver E. Huyck INVENTOR

BY

A. G. Burns ATTORNEY

Patented Oct. 13, 1925.

1,557,289

UNITED STATES PATENT OFFICE.

OLIVER E. HUYCK, OF WAUSEON, OHIO.

BEET TOPPER.

Application filed September 2, 1924. Serial No. 735,244.

*To all whom it may concern:*

Be it known that I, OLIVER E. HUYCK, a citizen of the United States of America, and resident of Wauseon, in the county of Fulton and State of Ohio, have invented certain new and useful Improvements in Beet Toppers, of which the following is a specification.

This invention relates to improvements in beet toppers especially for use in conjunction with beet harvesting machines for removing the tops from the beets preparatory to the excavating operations of the harvester with which the topper is used. The objects of the improvement are: First, to provide a mechanism for a beet harvester, constructed with a topping member for the removal of the beet tops and means for automatically regulating the elevation of the topping member as it is brought into action on the individual beets so that the tops will be severed at the proper place on each beet; second, to provide means for the removal of the lateral growth of foliage from the beets preliminary to severing the top from the bulb, and third, to provide manually operated means cooperable with the automatic means for regulating the position of the topping member.

These objects are accomplished by the construction illustrated in the accompanying drawings, in which:—

Figure 1:
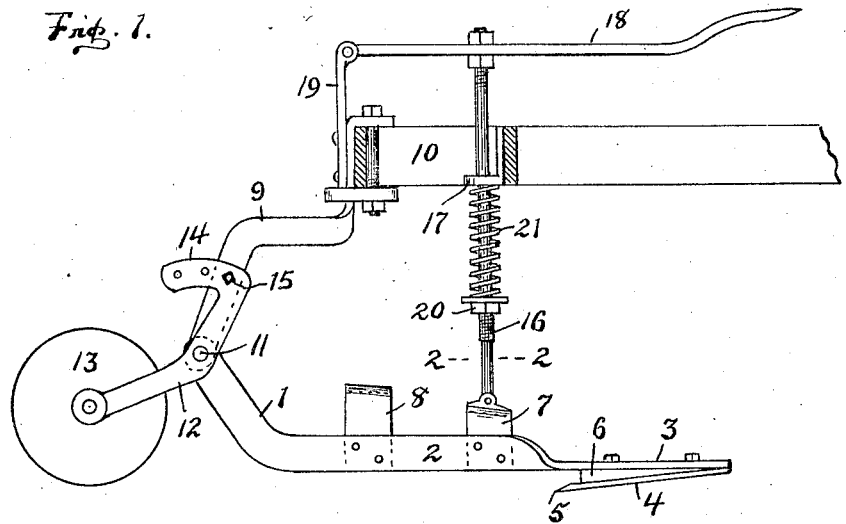
Figure 2:
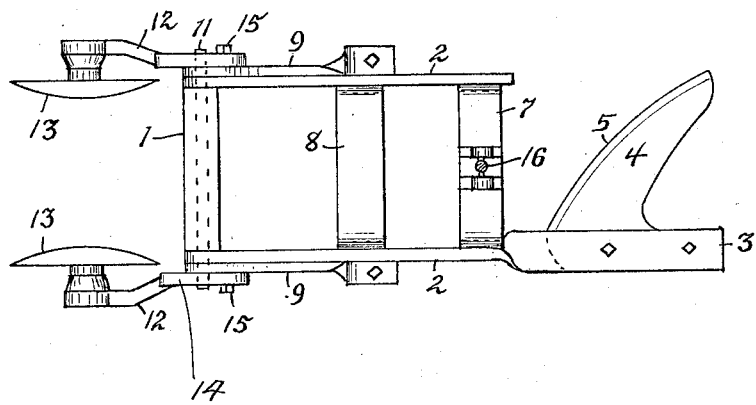

Fig. 1 is a side elevation of a machine embodying the invention including the front end of the frame of a harvesting machine to which the present invention is attached; and Fig. 2 is a plan view showing the invention, portions thereof being omitted.

The characters appearing in the description refer to parts shown in the drawings and designated thereon by corresponding characters.

The invention comprises a sled 1 having runners 2, one of which has a rear extension 3 with a topping member fixed thereon. The topping member consists of a blade 4 with a diagonally disposed cutting edge 5 along its forward edge.

A wedge shaped spacer 6 is interposed between the bottom of the extension 3 and the blade 4 so that the blade is held in a downwardly slanting position toward its cutting edge.

Secured to the rear part of the runner 2 is a transversely disposed arch 7, the top of which slants upwardly toward the front of the sled and extends in a plane above the topping member. Another arch 8 is similarly secured to the runners in a position advanced respecting the former arch, the top of the advanced arch being similarly inclined and extending in a plane above that of the top of the former arch.

The front ends of the runners 2 have hinged relation with corresponding brackets 9 that are mounted on the front end of the frame 10 of a beet harvester and which depend therefrom, there being a shaft 11 extending through the runners and the brackets.

On the shaft 11 adjacent the outer face of each bracket 9 is mounted an arm 12 having at its forward end a rotatable cutting disc 13, the opposite end of each arm having an arc-shaped perforated extension 14 that is adjustably secured to the corresponding bracket 9 by a bolt 15. The discs are spaced apart and extend in vertical planes approximately in line with the corresponding runners of the sled.

A post 16 has hinged connection with the rearmost arch 7 and extends upwardly through a guide 17 on the frame 10 of the harvester, and a foot-operated lever 18 is hinged on a bracket 19 extending upwardly from the frame and is connected with the top of the post 16 so that when downward pressure is applied to said lever the sled is borne downwardly accordingly. A nut 20 has threaded relation with the post, and a spring 21 is interposed on the post between the nut 20 and the guide 17 on the frame and acts to impart downward pressure to the sled through the medium of the post and the arch 7, the pressure being regulated by adjusting the nut.

In operating the invention the discs and sled are placed astride the row of beets at the front of the harvester to which it is secured, and as the harvester is drawn forward in the customary manner, the discs roll over the lateral growths of the foliage which are thereby severed. As the intact portions of the beet tops are encountered by the foremost arch they are bent forwardly during the passage of the arch thereover, and the rear arch being somewhat lower tends to lift the sled as it passes over the bent tops of the beets so that the topping blade encounters the bulbs of the beets at the proper elevation and effects the removal of the tops from the bulbs as the sled is progressed.

The nut 20 is adjusted so that the downward spring pressure on the sled is such that the tops of the beets of average size will sustain the rear arch at such elevation as to insure the cutting of the bulbs at the proper points. When a beet of exceptionally large dimensions, or trash is encountered, the downward pressure on the sled may be augmented by applying manual force to the foot lever to such an extent as is necessary to crush the beet top and bring the topping blade to the proper depth as the beet is encountered.

What I claim is:—

1. In combination with a beet harvesting machine, a pair of supporting brackets attachable to the frame of the harvester at the front thereof; a sled including a pair of parallel runners, the front ends of which have hinged connection with the brackets; a topping blade having fixed relation with the sled at the rear end thereof; a transversely disposed arch fixed on the sled at the rear end thereof in advance of said blade, the top of the arch slanting upwardly toward the front end of the sled and extending in a plane above the blade; a second similar arch secured to the sled in advance of the former arch, its top being in a plane higher than the former arch; a pair of arms having hinged connection at the front of the sled, one at each side thereof, including adjustable sustaining means in connection with the corresponding brackets; a pair of cutting discs supported respectively by said arms at the forward ends thereof; a vertically movable post having operable relation with the sled at the rear part thereof; an adjustable spring mechanism imparting downward movement to the post; and a manually operated lever in connection with the post co-operable with said spring in applying downward pressure to the sled.

2. In apparatus of the class described, a pair of pendent brackets; a sled having hinged connection at its front with the brackets; a topping blade having a transversely disposed cutting edge, fixed at the rear end of the sled; an arch fixed at the rear end of the sled in advance of the blade, its top slanting upwardly toward the front of the sled and extending in a plane above the blade; a pair of cutting discs spaced apart and having supported relation in connection with said brackets, there being means for vertically adjusting the discs relative to the sled; and a mechanism operable to impart downward pressure to the sled at the rear part thereof.

3. In apparatus of the class described, a sled having a pair of parallel runners; a topping blade extending transversely respecting the sled and fixed thereto at the rear end thereof; an arch fixed on the sled in advance of the blade, the top of said arch slanting upwardly toward the front of the sled; a second similar arch fixed on the sled in advance of the former arch in spaced relation therewith, its top extending in a plane above that of the former arch, said runners being held spaced apart by said arches; a pair of cutting discs including supporting means for same at the front of the sled, said discs being spaced apart and alined respectively with said runners; and a mechanism operable to impart downward pressure to the sled at the rear part thereof.

4. In apparatus of the class described, a sled having a pair of parallel runners; a topping blade extending transversely respecting the sled and fixed thereto at the rear end thereof; an arch fixed on the sled in advance of the blade, the top of said arch slanting upwardly toward the front of the sled; a second similar arch fixed on the sled in advance of the former arch in spaced relation therewith, its top extending in a plane above that of the former arch, said runners being held spaced apart by said arches; and a pair of cutting discs including supporting means for same at the front of the sled, said discs being spaced apart and alined respectively with said runners.

5. In apparatus of the class described, a sled having a pair of parallel runners; a cutting means at the front end of the sled including a pair of discs alined respectively with the runners; a topping blade transversely disposed respecting the sled and fixed thereto at the rear end thereof; an arch fixed on the sled at the rear end thereof in advance of said blade, its top extending in a plane above the blade; automatic means applying downward pressure to the sled at the rear part thereof; and manually operated means for augmenting the downward pressure.

In testimony whereof I affix my signature.

OLIVER E. HUYCK.